United States Patent [19]

Kong

[11] Patent Number: 5,780,937
[45] Date of Patent: Jul. 14, 1998

[54] SAFETY MANAGEMENT SYSTEM FOR A MOTOR VEHICLE

[76] Inventor: Yu Wei Kong, 6288 Pride La., Las Vegas, Nev. 89103

[21] Appl. No.: 796,781

[22] Filed: Feb. 10, 1997

[51] Int. Cl.$^6$ ................................................ B60R 25/00
[52] U.S. Cl. .................. 307/10.1; 307/9.1; 364/424.055; 340/426
[58] Field of Search ..................... 307/91.1, 10.1–10.6; 280/268, 271, 272, 273, 281, 287; 364/423.098, 424.045, 424.055, 424.059; 340/825.31, 825.36; 318/568.1; 73/546; 200/6 C, 456; 297/198, 268

[56] References Cited

U.S. PATENT DOCUMENTS

| | | | |
|---|---|---|---|
| 4,682,088 | 7/1987 | Sullivan | 318/568 |
| 4,876,649 | 10/1989 | Kawai et al. | 307/10.2 |
| 5,006,771 | 4/1991 | Ogasawara | 318/568.1 |
| 5,525,843 | 6/1996 | Höwing | 307/9.1 |
| 5,602,425 | 2/1997 | Wilhelmi et al. | 307/10.1 |
| 5,614,769 | 3/1997 | Kuroda | 307/10.2 |

*Primary Examiner*—William M. Shoop, Jr.
*Assistant Examiner*—Peter Ganjian
*Attorney, Agent, or Firm*—Quirk & Tratos

[57] ABSTRACT

A driver's seat sensor switch has contacts that are operable to generate a driver present signal in response to a driver's seat of a motor vehicle being occupied. A passenger's seat sensor switch has contacts that are operable to generate a passenger present signal in response to a passenger's seat of the vehicle being occupied. The driver present signal is applied to a driver seat belt switch that opens when the driver's seat belt is not properly fastened. When the driver's seat belt is not properly fastened, the driver present signal is applied through the seat belt switch to a light, whereby the driver present signal conditions illumination of the light as an indication that the driver's seat belt is not properly fastened. In a similar manner, an indication is provided when the passenger's seat belt is not properly fastened. The passenger present signal additionally conditions a passenger air bag for deployment in response to the vehicle being in an accident. Contacts of the sensor switches are connected to generate a vehicle empty security signal when the vehicle is not occupied. Windows of the vehicle close and doors of the vehicle lock in response to the vehicle empty security signal. When the driver present signal is generated, an anti-theft device is conditioned for activation by momentarily moving an arm of a switch. The anti-theft device is activated by a driver absent security signal that is generated by the driver sensor switch.

12 Claims, 4 Drawing Sheets

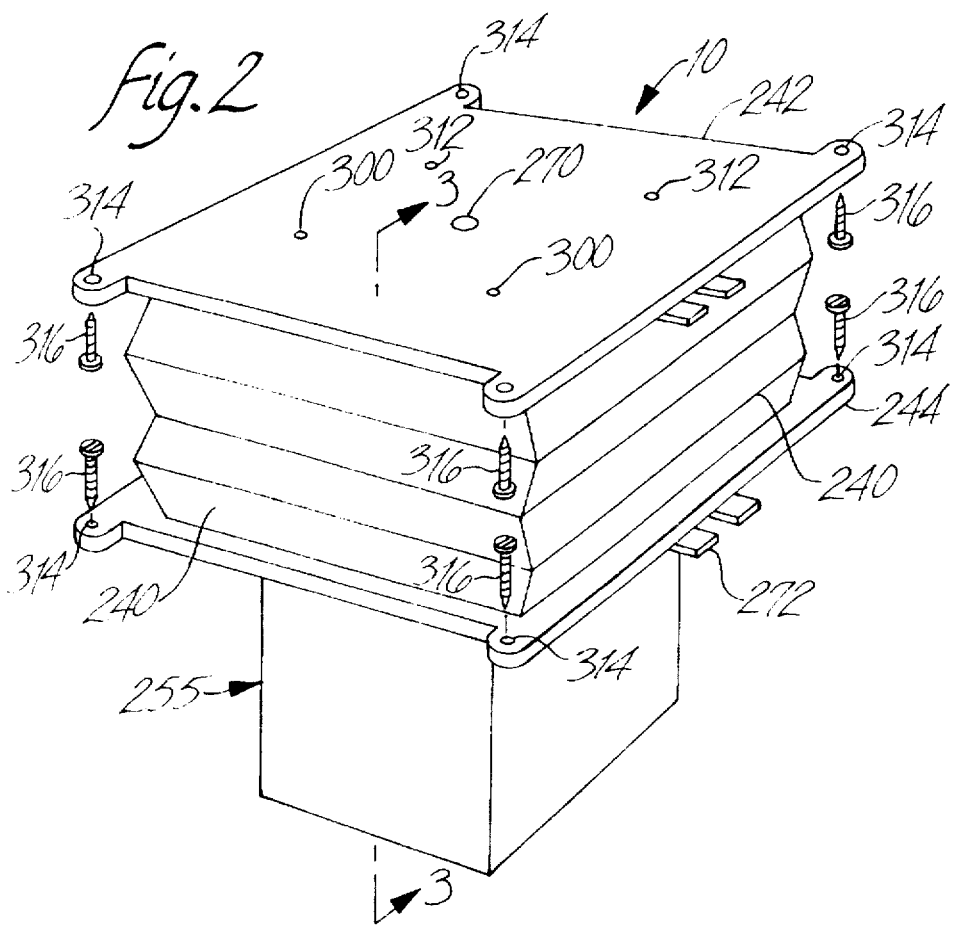
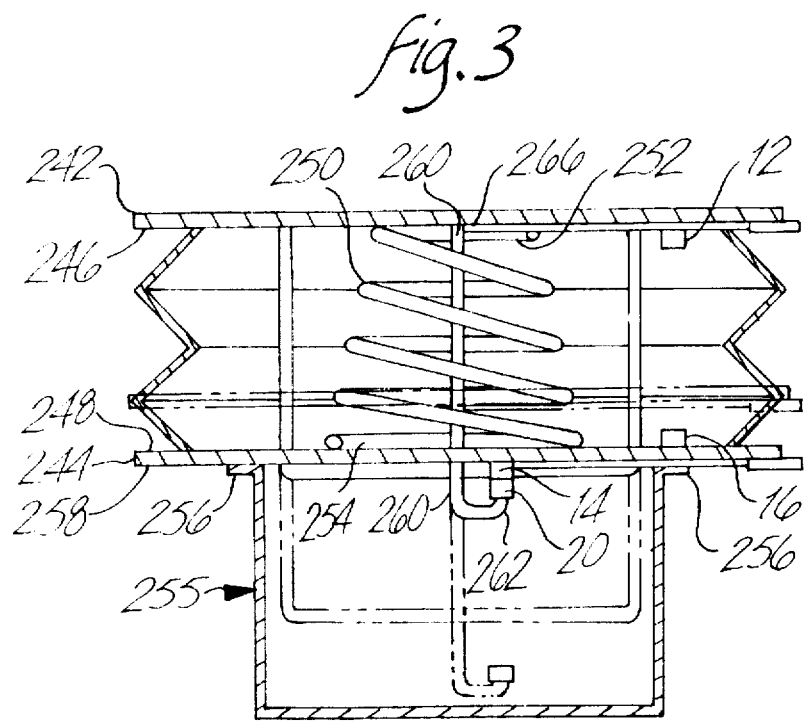

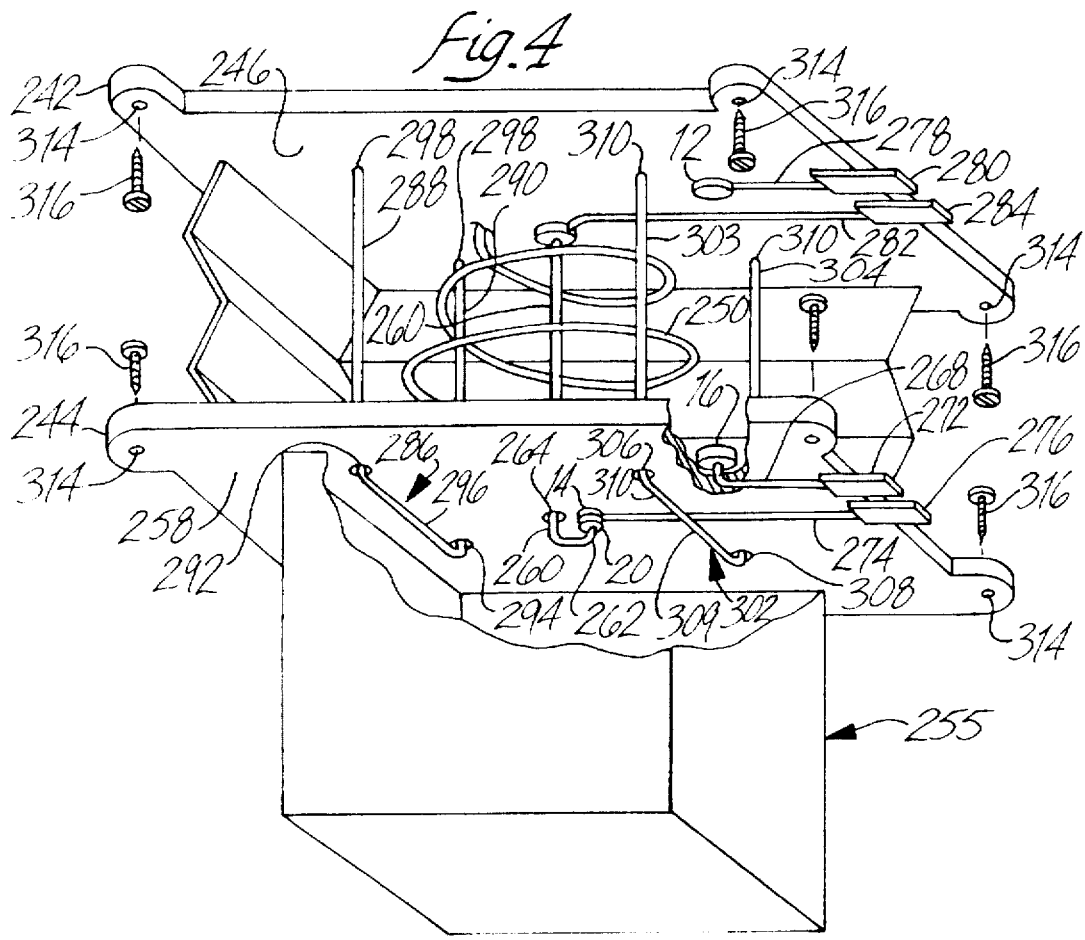
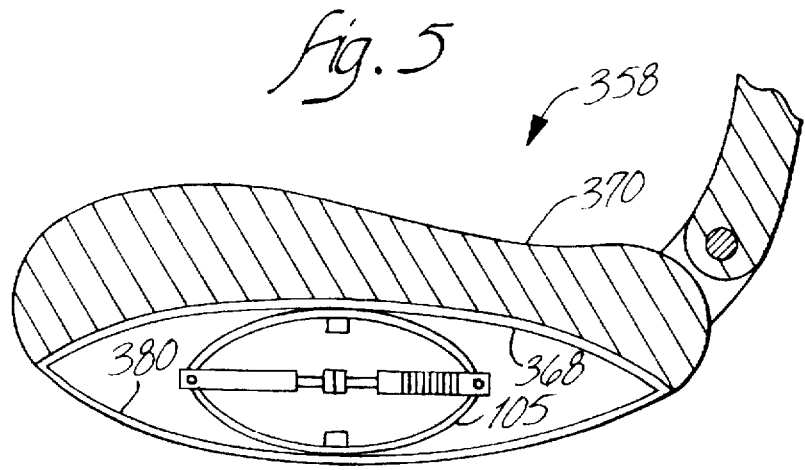

SAFETY MANAGEMENT SYSTEM FOR A MOTOR VEHICLE

BACKGROUND OF THE INVENTION

1. Field of Invention

This invention is in the general field of motor vehicles and, more particularly, is a safety system predicated upon sensing both the presence and the absence of a person seated in a motor vehicle.

2. Description of the Prior Art

A well known motor vehicle safety device is an air bag that is deployed to protect a driver and a passenger in a motor vehicle in the event of a vehicular accident, such as a collision. When the accident occurs, the air bag is usually deployed independent of either the presence or size of the passenger. It should be understood that in the absence of the passenger, deployment of the air bag is unnecessary. Moreover, resetting the deployed air bag is expensive.

When the passenger is an infant, for example, deployment of the air bag may result in the death or injury of the infant. Therefore, it is desirable to limit deployment of the passenger's air bag in accordance with the size of the passenger.

At least one manufacturer has provided the vehicle with a switch that may be thrown to prevent deployment of the air bag. However, the effectiveness of the switch depends upon a person in the vehicle, usually the driver, remembering to operate the switch appropriately.

Another well known motor vehicle safety device is a seat belt that maintains either the driver or the passenger in a seat in the event of the accident. The vehicle may provide an indication on its dashboard control panel that an occupant of the vehicle has not properly fastened a seat belt. However, when the driver and a plurality of passengers are occupants the vehicle, the dashboard indication is not sufficient to indicate with particularity the seat belt that is not properly fastened.

Among the most fundamental motor vehicle security devices are a door lock on each of the doors of the vehicle and windows of the vehicle. When the doors are locked and the windows are closed, there is a modicum of protection against an intruder entering the vehicle. However, locking of the doors and closing of the windows usually depends upon the memory of the driver. Heretofore there has not been a suitable system for preventing deployment of the air bag, indicating with particularity the seat belt that is not properly fastened, locking the doors and closing the windows.

Carjacking is a prevalent form of robbery whereby a robber forces the driver from the interior of the vehicle and then drives off in the vehicle. Heretofore there has not been a satisfactory for raising an alarm in the event of the carjacking.

SUMMARY OF THE INVENTION

An object of the present invention is to prevent injury to a passenger in a motor vehicle due to deployment of an air bag.

Another object of the present invention is to indicate with particularity that a seat belt is not a properly fastened.

Another object of the present invention is to raise an alarm when a motor vehicle is being carjacked.

According to a first aspect of the present invention, in response to a passenger's seat of a motor vehicle being occupied, a passenger sensor switch generates a passenger present signal. A passenger air bag is deployed in concurrent response to the passenger present signal and the vehicle being in an accident.

According to a second aspect of the present invention a passenger seat belt warning light is illuminated in concurrent response to the passenger present signal and a passenger's seat belt not being properly fastened.

According to the third aspect of the present invention, in response to a driver's seat of a motor vehicle being occupied, a driver's seat sensor switch generates a driver present signal. A driver seat belt warning light is illuminated in concurrent response to the driver present signal and a driver's seat belt not being properly fastened.

According to a fourth aspect of the present invention, in response to the driver's and passenger's seats being unoccupied, the sensor switches generate security signals that cause doors of the vehicle to lock and windows of the vehicle to close.

According to a fifth aspect of the present invention, when the drivers seat is occupied, an anti-theft device may be conditioned for activation. In response to the driver's seat being unoccupied, the driver sensor switch generates a driver absent security signal that activates the anti-theft device when it has been conditioned for activation.

The gist of the invention is utilization of seat sensor switches for all aspects of a security system for a motor vehicle. The seat sensor generates signals that are used in deployment of an air bag, to indicate when a seat belt is not properly fastened, cause a locking of doors and closing of windows when the vehicle is empty and cause activation of an anti-theft device.

Other objects, features, and advantages of the invention should be apparent from the following description of the preferred embodiment as illustrated in the accompanying drawing.

BRIEF DESCRIPTION OF THE DRAWING

FIG. 2 is a perspective view of a seat sensor switch that is included in the embodiment of FIG. 1;

FIG. 3 is a section of FIG. 2 taken along the line 3—3;

FIG. 4 is a perspective view, with parts broken away, of the switch of FIG. 2;

FIG. 5 is a section of a side elevation of a seat where the switch of FIG. 2 is installed;

DESCRIPTION OF THE PREFERRED EMBODIMENT

This invention is predicated upon utilizing a seat sensor switch in a driver's seat of a motor vehicle and a seat sensor switch in a passenger's seat of the vehicle to generate a driver present signal and a passenger present signal, respectively. The driver present signal is generated in response to the driver's seat being occupied. The passenger present signal is generated in response to a mass having a weight, greater than a minimum weight (referred to hereinafter as a minimum weight mass), occupying the passenger seat.

In order to set forth the teachings of the present invention without confusing detail, the vehicle is described as having a driver's seat, two passenger seats, two windows and two doors. It should be understood that the invention has utility when the vehicle has more than two passenger seats, two windows and two doors.

Figure 1:
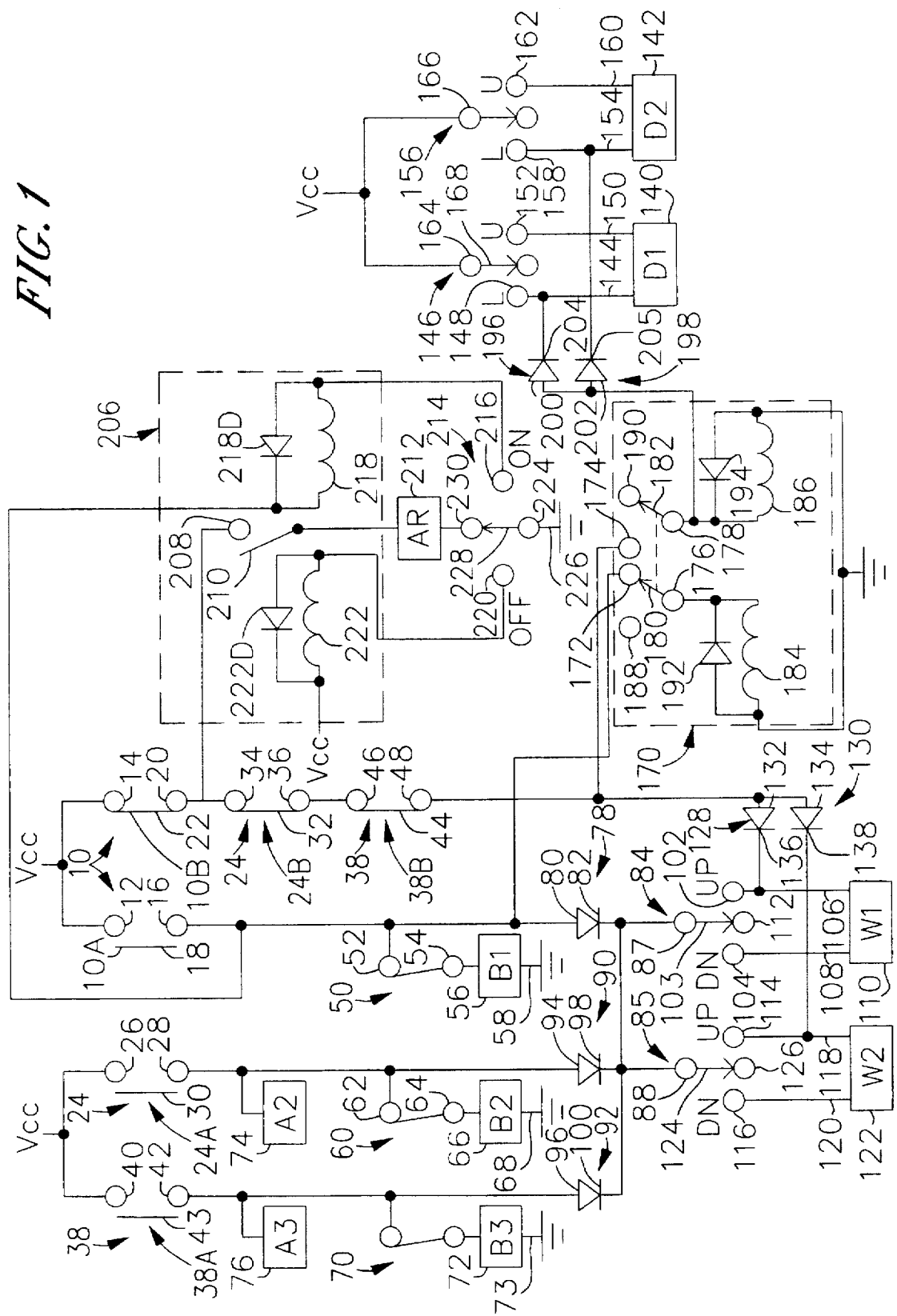
FIG. 1 is a schematic block diagram of the preferred embodiment of the present invention.

As shown in FIG. 1, a driver sensor switch 10 is installed within a driver's seat of the vehicle. The structure of the switch 10 is described hereinafter in connection with FIG. 2.

The switch 10 has a normally open part 10A that includes a contact 12. Additionally, a normally closed part 10B of the switch 10 includes a contact 14. The contacts 12, 14 are connected to a positive terminal of a voltage source that provides a voltage referred to as Vcc. In this embodiment the voltage, Vcc, is provided by the positive terminal of a battery of the vehicle.

The normally open part 10A additionally includes a contact 16. In response to the driver's seat being occupied, a switch bar 18 electrically connects the contacts 12, 16. Therefore, the contacts 12, 16 are normally open but close in response to the driver's seat being occupied, whereby a driver present signal voltage, substantially equal in amplitude to the voltage, Vcc, is generated at the contact 16.

The normally closed part 10B additionally includes a contact 20. In response to the driver's seat being unoccupied, a switch bar 22, similar to the switch bar 18, electrically connects the contacts 14, 20. Therefore, the contacts 14, 20 are normally closed, whereby a driver absent security signal voltage, substantially equal in amplitude to the voltage, Vcc, is generated at the contact 20.

A passenger sensor switch 24, similar to the switch 10, is installed within a first passenger's seat of the vehicle. The switch 24 has a normally open part 24A and a normally closed part 24B.

In response to the first passenger's seat being occupied by the minimum weight mass, contacts 26, 28 of the part 24A are electrically connected by a switch bar 30. Therefore, the contacts 26, 28 are normally open but close in response to the first passenger's seat being occupied by the minimum weight mass. The closure of the contacts 26, 28 causes a first passenger present signal voltage, substantially equal in amplitude to the voltage, Vcc, to be generated at the contact 28.

In response to the first passenger's seat being unoccupied by the minimum weight mass, a switch bar 32, similar to the switch bar 22, electrically connects contacts 34, 36 of the part 24B. Therefore, the contacts 34, 36 are normally closed but open in response to the first passenger's seat being occupied by the minimum weight mass. The contact 34 is connected to the contact 20. Accordingly, the contacts 14, 20 and the contacts 34, 36 are connected in series.

A passenger sensor switch 38, similar to the switch 10, is installed within a second passenger's seat of the vehicle. The switch 38 has a normally open part 38A and a normally closed part 38B.

In response to the second passenger's seat being occupied by the minimum weight mass, contacts 40, 42 of the part 38A are electrically connected by a switch bar 43. Therefore, the contacts 40, 42 are normally open but close in response to the second passenger's seat being occupied by the minimum weight mass. The closure of the contacts 40, 42 causes a second passenger present signal voltage, substantially equal in amplitude to the voltage, Vcc, to be generated at the contact 42. As explained hereinafter, because a passenger present signal is generated when a passenger's seat is occupied by the minimum weight mass, a danger of deployment of an air bag injuring a small person is obviated.

In response to the second passenger's seat being unoccupied by the minimum weight mass, a switch bar 44, similar to the switch bar 22, electrically connects contacts 46, 48 of the part 38B. Like the contacts 34, 36, the contacts 46, 48 are normally closed but open in response to the second passenger's seat being occupied by the minimum weight mass. The contact 46 is connected to the contact 36. Accordingly, the contacts 14, 20, the contacts 34, 36 and the contacts 46, 48 are all connected in series.

The contact 16 is connected to a single pole single throw driver's seat belt switch 50 at a contact 52 thereof. A pole 54 of the switch 50 is connected to one of two terminals of a driver's seat belt warning light 56; the other terminal is connected through a signal line 58 to ground. In this embodiment, ground is a negative terminal of the battery of the vehicle.

In response to the driver's seat being occupied and the driver's seat belt not being properly fastened, the driver present signal voltage is applied via the switch 50 to the light 56, whereby the light 56 is illuminated. However, when the driver's seat belt is properly fastened, the switch 50 opens, thereby preventing the application of the driver present signal voltage to the light 56. Thus, an indication provided by the light 56 is in concurrent response to the driver present signal voltage and the driver's seat belt not being properly fastened.

Similar to the contact 16, the contact 28 is connected to a single pole single throw first passenger's seat belt switch 60, similar to the switch 50, at a contact 62 thereof. A pole 64 of the switch 60 is connected to one of two terminals of a first passenger's seat belt light 66; the other terminal is connected through a signal line 68 to ground.

In response to the first passenger's seat being occupied by the minimum weight mass and the first passenger's seat belt not being properly fastened, the first passenger present signal voltage is applied via the switch 60 to the light 66. However, when the first passenger's seat belt is properly fastened, the switch 60 opens, thereby preventing the application of the first passenger present signal voltage to the light 66. Thus, an indication provided by the light 66 is in concurrent response to the first passenger present signal voltage and the first passenger's seat belt not being properly fastened.

Similar to the contacts 16, 28, the contact 42 is connected through a single pole single throw second passenger's seat belt switch 70, similar to the switch 50, to a second passenger's seat belt light 72. In a manner similar to the lights 56, 66, the light 72 is connected to ground through a signal line 73. An indication provided by the light 72 is in concurrent response to the second passenger present signal voltage and the second passenger's seat belt not being properly fastened.

Preferably, the lights 56, 66, 72 are located in a driver's dashboard control panel. The lights 56, 66, 72 indicate with particularity which person in the vehicle is not seated with a properly fastened seat belt.

The contacts 28, 42 are additionally connected to air bag deployment units 74, 76, respectively, whereby the switches 24, 38 are operable to cause the first and second passenger present signals to be applied to the units 74, 76. First and second passenger air bags (not shown) are respectively associated with the units 74, 76. The first air bag is deployed in concurrent response to the vehicle being in an accident, such as a collision, and the first passenger present signal voltage.

In a corresponding manner, the second air bag is deployed in concurrent response to the second passenger present signal and the vehicle being in an accident. It should be understood that a driver's air bag is deployed independent of the driver present signal voltage since the probability is vanishingly small that the driver is not present when the vehicle is in the accident.

The contact 16 is additionally connected to a diode 78 at an anode 80 thereof. A cathode 82 of the diode 78 is connected to single pole triple throw switches 84, 85 at poles 87, 88, respectively, thereof. In a similar manner, the contacts 28, 42 are connected to diodes 90, 92 at anodes 94, 96 thereof, respectively. A cathode 98 of the diode 90 and a cathode 100 of the diode 92 are connected to the poles 87, 88.

It should be understood that the driver present signal voltage causes a forward bias of the diode 78 whereby the driver present signal voltage is applied to the poles 87, 88. The first and/or second passenger present signal voltages similarly cause a forward bias of the diodes 90, 92, respectively whereby the passenger present voltages are applied to the poles 87, 88.

The driver present signal voltage, for example, causes a reverse bias of the diodes 90, 92 in the absence of the passenger present signal voltages, thereby preventing the driver present signal voltage from being applied to the contacts 28, 42. In other words, although the cathodes 82, 98, 100 are connected to the poles 87, 88, the diodes 78, 90, 92 serve to maintain an electrical isolation of the contacts 16, 28, 42 from each other.

The switch 84 has an up contact 102 and a down contact 104 that are respectively connected to an up signal line 106 and a down signal line 108 of an electrically operated window 110 of the vehicle. Electrically operated windows are well known to those skilled in the art.

The pole 87 is connected to a switch arm 103 of the switch 84. A person may alternatively move the arm 103 from a center-off contact 112 of the switch 84 to either the contact 102 or the contact 104. In concurrent response to a signal voltage being applied to the poles 87, 88 and the arm 103 being moved to the contact 102, the window 110 closes. Correspondingly, in concurrent response to a signal voltage being applied to the poles 87, 88 and the arm 103 being moved to the contact 104, the window 110 opens.

It should be understood that when the person releases the arm 103, a spring in the switch 84 causes the arm 103 to return to the contact 112. The switch 84 is of a type well known in the art.

Like the switch 84, the switch 85 has an up contact 114 and a down contact 116 that are respectively connected to an up signal line 118 and a down signal line 120 of an electrically operated window 122 that is similar to the window 110.

The pole 88 is connected to a switch arm 124 of the switch 85. The person may alternatively move the arm 124 from a center-off contact 126 of the switch 85 to either the contact 114 or the contact 116. In concurrent response to a signal voltage being applied to the poles 87, 88 and the arm 124 being moved to the contact 114, the window 122 closes. Correspondingly, in concurrent response to a signal voltage being applied to the poles 87, 88 and the arm 126 being moved to the contact 116, the window 110 opens. Like the arm 103, when the person releases the arm 124, a spring in the switch 85 causes the arm 124 to return to the contact 126.

When the switches 10, 24, 38 do not provide either the driver present signal voltage or a passenger present signal voltage, a vehicle empty security signal voltage, substantially equal in amplitude to the voltage, Vcc, is generated at the contact 48. The contact 48 is connected to diodes 128, 130 at anodes 132, 134, respectively thereof.

The cathode 136 of the diode 128 is connected to the signal line 106. The cathode 138 of the diode 130 is connected to the signal line 118. Accordingly, the vehicle empty security signal voltage is applied via the diodes 128, 130 to the signal lines 106, 118, respectively, thereby causing the windows 110, 122 to close.

The vehicle has doors 140, 142 that include electric door locks. The lock of the door 140 is connected through a lock signal line 144 to a single pole triple throw switch 146 at a contact 148 thereof. The lock of the door 140 is additionally connected through an unlock signal line 150 to a contact 152 of the switch 146.

In a similar manner, the lock of the door 142 is connected through a lock signal line 154 to a single pole triple throw switch 156 at a contact 158 thereof. The lock of the door 142 is additionally connected through an unlock signal line 160 to a contact 162 of the switch 156.

The switches 146, 156 have respective poles 164, 166 where the voltage, Vcc is applied. The switches 146, 156 are similar to the switches 84, 85 described hereinbefore.

When, for example, the person moves a switch arm 168 to the contact 148, the voltage, Vcc, is applied to the line 144 to cause the door 140 to lock. Correspondingly, when the person moves the arm 168 to the contact 152, the voltage, Vcc, is applied to the line 150 to cause the door 140 to unlock. The switch 156 is operable to lock and unlock the door 142 in a manner similar the switch 146. Electric door locks are well known to those skilled in the art.

This embodiment includes a double pole double throw latching relay 170 to cause doors 140, 142 of the vehicle to lock in response to the vehicle empty security signal voltage. The relay 170 has a set switch with a contact 172 that is connected to the contact 16 whereby the driver present signal voltage is applied to the contact 172. A pole 176 of the set switch is connected to one end of a set coil 184. The other end of the set coil 184 is connected to ground.

The relay 170 has a reset switch with a contact 174 that is connected to the contact 48 whereby the vehicle empty signal security signal voltage is applied to the contact 174. A pole 178 of the reset switch is connected to one end of a reset coil 186. The other end of the reset coil 186 is connected to ground.

The pole 178 is additionally connected to diodes 196, 198 at respective anodes 200, 202 thereof. A cathode 204 of the diode 196 is connected to the line 144. A cathode 205 of the diode 198 is connected to the line 154.

It should be understood that when a positive voltage is applied to the set coil 184 via the pole 176, a switch arm 180 of the set switch moves to a contact 188 thereof and the switch arm 182 of the reset switch moves to the contact 174. Correspondingly, when a positive voltage is applied to the reset coil 186 via the pole 178, the switch arm 180 moves to the contact 172 and the switch arm 182 moves to a contact 190 of the second switch. Latching relays are well known to those skilled in the art.

Accordingly, the arm 182 moves from the contact 190 to the contact 174 in response to the driver present signal voltage, whereby the relay 170 is conditioned to cause the doors 140, 142 to lock. Thereafter, when the vehicle is emptied, the vehicle empty security signal voltage is applied via the pole 178 to the coil 186 for a time interval long enough to cause the arm 182 to move away from the contact 174. Because the arm 182 moves away from the contact 174, a pulse of limited duration is applied to the coil 186. The pulse of limited duration is additionally applied through the diodes 196, 198 to the lines 144, 154, thereby causing the doors 140, 142 to lock.

A discontinuation of current through either of the coils 184, 186 may cause a destructive voltage transient. Diodes 192, 194 are connected across the coils 184, 186, respectively, to suppress the voltage transient.

The contact 20 is connected to a single pole single throw latching relay 206 at a contact 208 thereof, whereby the driver absent security signal voltage is applied to the contact 208. A switch arm 210 of the relay 206 is connected to an anti-theft device 212. The contact 16 is connected to a single pole triple throw switch 214 at a contact 216 thereof through a coil 218 of the relay 206 whereby the driver present signal voltage is provided to the relay 206. Vcc is applied to a contact 220 of the switch 214 through a coil 222 of the relay 206. Diodes 218D, 222D are respectively connected across the coils 218, 222 for reasons given in connection with the diodes 192, 194. The switch 214 is similar to the switches 84, 85.

A pole 224 of the switch 214 is connected to ground through a signal line 226. In concurrent response to the driver present signal and an arm 228 of the switch 214 being momentarily moved to the contact 216, the arm 210 moves from an off position to the contact 208, whereby the anti-theft device 212 is conditioned for activation. In other words, the anti-theft device is conditioned for activation by the driver while seated in the vehicle by momentarily moving the arm 228 to the contact 216.

The contact 230 is connected to the anti-theft device 212. It should be understood that the arm 228 is returned by springs to the contact 230.

When the arm 228 is returned to the contact 230, an application of the driver absent security signal voltage via the contact 208 activates the anti-theft device 212. Accordingly, when the anti-theft device 212 is conditioned for activation and a driver is confronted by a carjacker, the driver activates the anti-theft device 212 by leaving the vehicle. The anti-theft device 212 is deactivated when the arm 228 is momentarily brought to the contact 220 to thereby cause the arm 210 to move away from the contact 208.

As shown in FIGS. 2-4, the switch 10 includes accordion-like foldable sides 240 that are fixedly connected in any suitable manner to generally rectangular top panel 242 and a generally rectangular bottom panel 244 at respective opposed surfaces 246, 248 thereof. A coil spring 250 (FIG. 3) has ends 252, 254 that are connected to the surfaces 246, 248, respectively, in the interior of the switch 10.

A box 255 has an open side that is connected to the panel 244. More particularly, edges 256 of the open side abut a surface 258 of the panel 244. As explained hereinafter, when the spring 250 is compressed, the position of the contact 20 changes within the box 255.

The contacts 12, 16 are respectively connected to the surfaces 246, 248. When the spring 250 is sufficiently compressed, the contacts 12, 16 are in an abutting relationship and are thereby electrically connected. In a passenger's seat, the spring is sufficiently compressed by a compressive force that is equivalent to the minimum weight mass.

The contact 14 is fixedly connected to the surface 258. The contact 20 is connected to a J bar 260 at an end 262 thereof within the box 255. The J bar 260 passes through a hole 264 (FIG. 4) in the panel 244. An end 266 of the J bar 260 is connected within a hole 270 (FIG. 2) through the panel 242.

When the spring 250 is not compressed, the contacts 14, 20 are in an abutting relationship and are thereby electrically connected. However, when the spring 250 is compressed, there is an increased extension of the J bar 260 into the box 255, thereby separating the contacts 14, 20 and removing their electrical connection.

A conductor 268 is connected to the contact 16. The conductor 268 passes through a hole in the panel 244 and is fastened in any suitable manner to the surface 258. The conductor 268 passes between the edge 256 (FIG. 3) and the surface 258 to the exterior of the box 255.

A tab 272 is connected to the contact 16 through the conductor 268 on the exterior of the box 255. The tab 272 is used to connect the contact 16 to the relays 170, 206, the contact 52 and the diode 78 (FIG. 1).

A conductor 274 is connected to the contact 14. The conductor 274 is fastened in any suitable manner to the surface 258. The conductor 274 passes between the edge 256 and the surface 258 to the exterior of the box 255.

A tab 276, similar to the tab 272, is connected to the contact 14 through the conductor 274 on the exterior of the box 255. The tab 276 is used to connect the contact 14 to the positive terminal of the battery whereby the voltage, Vcc, is applied to the contact 14.

A conductor 278 is connected to the contact 12. The conductor 278 is fastened in any suitable manner to the surface 246. The conductor 278 passes between an edge of the side 240 and the surface 246 to the exterior of the switch 10.

A tab 280, similar to the tab 272, is connected to the contact 12 through the conductor 278 on the exterior of the switch 10. The tab 280 is used to connect the contact 12 to the positive terminal of the battery whereby the voltage, Vcc, is applied to the contact 12.

A conductor 282 is connected to the J bar 260 where it passes adjacent to the surface 246. The conductor 282 is fastened in any suitable manner to the surface 246. The conductor 282 passes between an edge of the side 240 and the surface 246 to the exterior of the switch 10.

A tab 284, similar to the tab 272, is connected to the J bar 260 through the conductor 282 on the exterior of the switch 10. The tab 284 is used to connect the contact 20 to the contact 34 and the relay 206.

Preferably, a U shaped brace 286 has vertical members 288, 290 that pass through holes 292, 294, respectively, in the panel 244 whereby a horizontal member 296 of the brace 286 is within the box 255 and the members 288, 290 extend to the interior of the switch 10. Ends 298 of the members 288, 290 are connected to the panel 242 within holes 300 (FIG. 2).

Preferably, a U shaped brace 302, similar to the brace 286, has vertical members 303, 304 that pass through holes 306, 308, respectively, in the panel 244 whereby a horizontal member 309 of the brace 302 is within the box 255 and the members 303, 304 extend to the interior of the switch 10. Ends 310 of the members 303, 304 are connected to the panel 242 within holes 312 (FIG. 2). The braces 286, 302 prevent undesired lateral movement of the panel 242 relative to the panel 244. The switch 10 additionally includes mounting holes 314 through the corners of the panels 242, 244.

Figure 7:
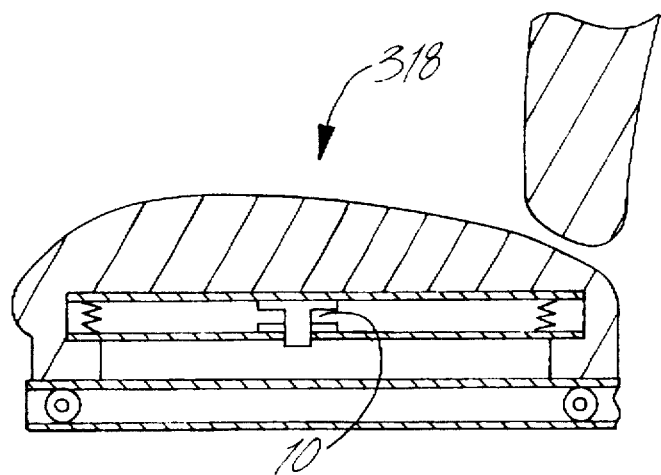
FIG. 7 is a section of a side elevation of a seat where the switch of FIG. 6 is installed.

As shown in FIG. 7, screws 316 respectively pass through the holes 314 to fasten the switch 10 into a seat 318 of the vehicle.

Figure 6:
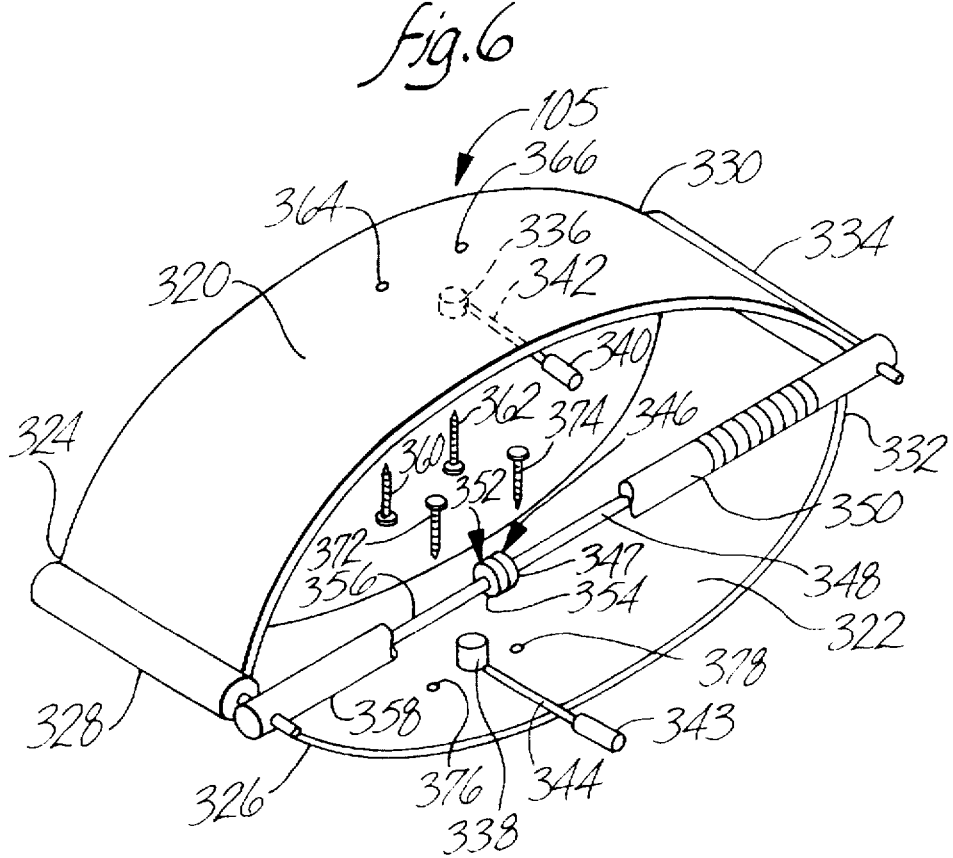
FIG. 6 is a perspective view, with parts broken away, of a switch that may be alternatively included in the embodiment of FIG. 1.

As shown in FIG. 6, an alternative embodiment of the present invention includes a switch 10S comprised of an upper arcuate shaped leaf springs 320 and a lower arcuate shaped leaf spring 322. The leaf springs 320, 322 are similar to each other.

An end 324 of the spring 320 is connected to an end 326 of the spring 322 through an end fitting 328. Similarly, an end 330 of the spring 320 is connected to an end 332 of the spring 322 through an end fitting 334. Because of the arcuate shape, the connections to the fittings 328, 334 causes the springs 320, 322 to form an open ended enclosure with a generally oval cross-section.

Within the enclosure, a contact 336 having the general shape of a cylinder, has one end connected to the spring 320. A contact 338, similar to the contact 338 has one end connected to the spring 322. The contact 336 is connected to a tab 340 at the outside of the enclosure through a conductor 342. Correspondingly, the contact 338 is connected to a tab 343 at the outside of the enclosure through a conductor 344. In response to the springs 320, 322 being compressed, the contacts 336, 338 are in an abutting relationship and are thereby electrically connected. It should be understood that the contacts 336, 338 are electrically insulated from the springs 320, 322, respectively.

A contact 346, similar to the contact 336, has an end 347 coaxially connected to one end of a metal rod 348. An electrical insulation 350 covers the rod 348. The other end of the rod 348 is fixedly connected to the fitting 334.

A contact 352, similar to the contact 336, has an end 354 coaxially connected to one end of a metal rod 356 that is similar to the rod 348, whereby the contact 352 and the rod 356 are electrically connected. An electrical insulation 358 covers the rod 356. The other end of the rod 356 is fixedly connected to the fitting 328.

When the springs 320, 322 are not compressed, the contacts 346, 352 are in an abutting relationship, whereby the contacts 346, 352 are electrically connected. In response to the springs 320, 322 being compressed, there is an increased separation between the fittings 328, 334, thereby separating the contacts 346, 352 and removing their electrical connection. Conductors may be connected to the 348, 356 in any suitable manner.

As shown in FIG. 5, the switch 10S is installed within a seat 358. Preferably, screws 360, 362 (FIG. 6) pass through holes 364, 366, respectively and are screwed into an upper arcuate panel 368 (FIG. 5) within a cushion 370 of the seat 358. Preferably, the installation of the seat 10A further includes screws 372, 374 that pass through holes 376, 378, respectively, and are screwed into a lower arcuate panel 380 of the seat 358.

While the invention has been particularly shown and described with reference to a preferred embodiment thereof, it should be understood by those skilled in the art that changes in form and detail may be made therein without departing from the spirit and scope of the invention.

I claim:

1. A safety system for a motor vehicle with an electrically operated window and a door that has an electric door lock, comprising:

security means for generating a vehicle empty security signal in response to seats of said vehicle being unoccupied;

means for causing said window to close in response to said vehicle empty security signal;

driver present means for generating a driver present signal in response to a driver's seat of said vehicle being occupied; and a double pole double throw latching relay that is connected to said door lock, said security means and said driver present means, said latching relay being conditioned by said driver present signal to provide a pulse to said door lock in response to said vehicle empty security signal.

2. The system of claim 1 wherein said means for generating said driver present signal includes a driver sensor switch with normally open contacts that close in response to said driver's seat being occupied, said driver sensor switch being installed within a driver's seat of said vehicle.

3. The system of claim 2 wherein said driver sensor switch additionally has a pair of normally closed contacts that open in response to said driver's seat being occupied, said means for generating said vehicle empty signal comprising a passenger sensor switch installed within a passenger seat of said vehicle, said passenger sensor switch having normally closed contacts that open in response to said passenger's seat being occupied by a mass having a weight greater than a minimum weight, said normally closed contacts of said driver and passenger sensor switches being connected in series.

4. The system of claim 3, wherein a normally closed contact of said driver sensor switch generates a driver absent security signal, apparatus for activating an anti-theft device of said vehicle comprising:

a single pole single throw latching relay connected to said driver sensor switch and to said anti-theft device, said driver absent security signal being applied to a contact of said relay; and means for alternatively causing said driver present signal to be applied across a coil of said relay and said driver absent security signal to be applied to said anti-theft device.

5. The system of claim 4 wherein said driver's seat belt indicating means comprises:

a single pole single throw driver's seat belt switch that opens in response to said driver's seat belt being properly fastened, said driver's seat belt switch being connected to said driver sensor switch; and a light connected to said driver's seat belt switch that is illuminated in concurrent response to said driver present signal and said driver's seat belt switch not being closed.

6. The system of claim 5 additionally comprising an air bag deployment unit connected to said passenger sensor switch, deployment of an air bag associated with said unit being in concurrent response to said vehicle being in an accident and said passenger present signal.

7. The system of claim 4 wherein said means for alternatively causing is a switch.

8. The system of claim 3 wherein said vehicle has a driver's seat belt and a passenger's seat belt, additionally comprising:

means for indicating when said driver's seat belt is not properly fastened; and means for indicating when said passenger's seat belt is not properly fastened.

9. The system of claim 8 wherein said passenger sensor switch includes a pair of normally open contacts that provide a passenger present signal in response to said passenger seat being occupied by said minimum weight mass, said passenger seat belt indicating means comprising:

a single pole single throw passenger's seat belt switch that opens in response to said passenger's seat belt being properly fastened, said passenger's seat belt switch being connected to said passenger sensor switch; and a light connected to said passenger's seat belt switch that lights in concurrent response to said passenger present signal and said passenger's seat belt switch being closed.

10. The system of claim 3 wherein said driver sensor switch comprises:

- top and bottom end panels having opposed surfaces where said normally open contacts are respectively connected;
- accordion-like foldable sides connected to said panels to form an interior of said driver sensor switch, one of said normally closed contacts being connected to said bottom panel on the exterior of said sensor switch;
- a J bar having one end connected to the other normally closed contact, said J Bar passing through a hole in said bottom panel to said interior for connection of the other end of said J bar to said top panel where the other end of said J bar is fixedly connected;
- a coil spring that is connected to said panels within said interior, said normally open contacts being separated and said normally closed contacts being in an abutting relationship when said spring is not compressed, said normally open contacts being in an abutting relationship and said normally closed contacts being separated when said spring is compressed; and
- means for making electrical connections to said normally open and closed contacts on the exterior of said driver sensor switch.

11. The system of claim 3 wherein said driver sensor switch comprises:

- upper and lower arcuate leaf springs that are similar to each other, said springs having their ends connected together to form an open ended enclosure with a generally oval cross-section wherein said normally open contacts are respectively connected to said springs, said normally open contacts being in an abutting relationship in response to said springs being compressed;
- a first rod that has one end connected to one of the connected ends of said springs and the other end connected to one of said normally closed contacts;
- a second rod that has one end connected to the other of the connected ends of said springs and the other end connected to the other of said normally closed contacts, said normally closed contacts being in an abutting relationship when said springs are not compressed and separated in response to said springs being compressed; and
- means for making electrical connections to said normally open and normally closed contacts.

12. The apparatus of claim 1 wherein said latching relay comprises:

- a set switch having a set contact where said driver present signal voltage is applied, a set pole, a set coil and a set switch arm, said set coil and said set switch arm being connected to said set pole; and
- a reset switch having a reset contact where said vehicle empty security signal is applied, a reset pole that is connected to said to said door lock, a reset coil and a reset switch arm, said reset coil and said reset switch arm being connected to said reset pole, when said set switch arm has been moved to said set switch contact, said driver present signal causes said reset switch arm to move to said reset contact and said set switch arm to move away from said set contact whereby said latching relay is conditioned, said reset switch arm being moved away from said reset contact in concurrent response to said latching relay being conditioned and said vehicle empty security signal.

\* \* \* \* \*